United States Patent [19]

Goletto

[11] 4,212,777
[45] Jul. 15, 1980

[54] LINEAR, FLEXIBLE, HIGH TENSILE STRENGTH COPOLYAMIDES

[75] Inventor: Jean Goletto, Ecully, France

[73] Assignee: Rhone-Poulenc Industries, Paris, France

[21] Appl. No.: 954,753

[22] Filed: Oct. 26, 1978

[30] Foreign Application Priority Data

Oct. 28, 1977 [FR] France .................... 77 33341

[51] Int. Cl.² ............................. C08G 69/14
[52] U.S. Cl. .................... 260/18 N; 260/29.2 N
[58] Field of Search ........................ 260/18 N

[56] References Cited

U.S. PATENT DOCUMENTS

| | | | |
|---|---|---|---|
| 3,240,732 | 3/1966 | Ham et al. | 260/18 N |
| 3,823,105 | 7/1974 | Morival et al. | 260/18 N |

FOREIGN PATENT DOCUMENTS

| | | | |
|---|---|---|---|
| 776751 | 1/1968 | Canada | 260/18 N |
| 789085 | 7/1968 | Canada | 260/18 N |
| 1000216 | 8/1965 | United Kingdom | 260/18 N |

*Primary Examiner*—Ronald W. Griffin
*Attorney, Agent, or Firm*—Burns, Doane, Swecker & Mathis

[57] ABSTRACT

Copolyamides are polycondensed from a polymerization recipe including caprolactam, dimeric fatty acid and hexamethylenediamine, said dimeric fatty acid having an iodine number of less than 30, containing less than about 0.5% by weight of its monobasic fatty acid precursor, and not more than 5% of such acid having a basicity of greater than 2, and said dimeric fatty acid and the hexamethylenediamine being present in the recipe as a solvent solution of an essentially stoichiometrically balanced salt. The resultant copolyamides are essentially linear, flexible, display improved chemical and mechanical properties, and have high molecular weights and high melting points, and are easily shaped into a variety of useful articles, e.g., by molding or spinning.

32 Claims, No Drawings

LINEAR, FLEXIBLE, HIGH TENSILE STRENGTH COPOLYAMIDES

BACKGROUND OF THE INVENTION

1. Field of the Invention

The present invention relates to the preparation of flexible copolyamides having improved mechanical properties, high molecular weights and high melting points.

2. Description of the Prior Art

For certain plastics applications, it is necessary to have polymers which possess the characteristics of, on the one hand, the chemical resistance of the polyamides, while, on the other, having a greater flexibility than that of the conventional polyamides, such as polyhexamethylene adipamide or polycaprolactam.

The use of a plasticizer makes it possible to obtain flexibility, but this is generally to the detriment of the chemical stability, or the other mechanical properties. The use of copolyamides has also been proposed. Contrariwise, numerous copolyamides which possess a high flexibility, such as copolyamides based on caprolactam, hexamethylenediamine and adipic and sebacic acids, exhibit a high sensitivity to the action of solvents and, in particular, of water. Other copolyamides, which combine flexibility with a good resistance to water, too have been proposed. Examples which may be mentioned are the copolyamides described in U.S. Pat. No. 3,240,732 or French Pat. No. 1,395,076.

However, these prior art copolyamides do not possess adequate mechanical characteristics such as to find use in place of the conventional polyamides.

SUMMARY OF THE INVENTION

It has now been found, and which is a major object of the invention, that by selecting an initial dimeric acid and operating in accordance with well defined process parameters, it is possible to obtain copolymers from a dimeric fatty acid, hexamethylenediamine and caprolactam which have greatly improved mechanical characteristics, equivalent to those of the corresponding homopolymers, while at the same time retaining those desirable properties of elasticity and of chemical resistance of the latter. Such process, moreover, exhibits the added advantage that it leads, under industrially viable conditions, to products of constant and uniform quality.

DETAILED DESCRIPTION OF THE INVENTION

Particularly, an improved process has now been found which enables production of essentially linear flexible copolyamides which are based on caprolactam, dimeric fatty acids and hexamethylenediamine, and which have a tensile strength of more than 5 DaN/mm$^2$, which process is characterized, [1] by utilizing in formulating the polymerization recipe a dimeric fatty acid containing less than 0.5% by weight, and preferably less than 0.1% by weight, of a monobasic acid and less than 5% by weight of an acid having a basicity of more than 2, and [2] by including in the polymerization recipe the salt of such dimeric fatty acid with the hexamethylenediamine, and which salt is obtained in soluble form in solvents comprising water and an alcohol having fewer than 5 carbon atoms, or water and caprolactam, or in caprolactam, the stoichiometry of this salt being ensured and monitored by means of a pH meter in a solvent comprising water and an alcohol, water and a diol, or water and caprolactam.

The caprolactam employed in the process according to the invention has the same characteristics as those of the product conventionally employed for obtaining polycaprolactam in industry.

Likewise, the hexamethylenediamine possesses the properties of the product presently utilized for obtaining polyhexamethylene adipamide in industry.

On the other hand, the dimeric fatty acid, which is an industrial product usually containing impurities, must have a particular composition. It has been found that this dimer must contain not more than 0.5%, and preferably not more than 0.1% by weight, of the residual, undimerized monobasic acid and not more than 5% by weight of the acid having a basicity of more than 2, by examples trimers or the like, and it must possess an iodine number of less than 30. A dimeric acid which does not contain any monobasic acid detectable by gas phase chromatography of the methyl esters, and which contains about 3% or less of the acid having a basicity of more than 2 and has an iodine number of about 10, will preferably be selected. The mean molecular weight of the dimer is preferably on the order 565. But it is possible to use other dimeric acids having molecular weight between 370 and 800.

The industrial processes which are usually employed for manufacturing homopolymers derived from diacids and diamines consist, in a first stage, in obtaining the stoichiometric compound of this diacid with the diamine (salt) and then in effecting a polycondensation thereof. There are two techniques for obtaining the salt: either the salt is crystallized and purified from its solution, or a concentrated solution of this salt is obtained, the stoichiometry of which can be monitored and adjusted, for example, using a pH meter. However, in the case where the diacid is a dimeric acid as defined above and the diamine is hexamethylenediamine, the first process cannot be used because the salt possesses the characteristics of a soap which cannot easily be isolated and purified. And in order to carry out the second method, it is necessary to use a particular solvent, the water which is typically employed being a solvent neither for the dimeric acid nor for the salt obtained, under approximately ambient conditions. It has now been found that, unexpectedly, it is possible to obtain a concentrated and stable solution under ambient conditions; that is to say that, at about 25° C., it is possible to obtain a concentration of at least 30 to 70% of solids with a water/caprolactam mixture. However, it is quite obvious that the scope of the invention would not be exceeded by operating at a higher temperature and, therefore, possibly at a higher concentration. The water/caprolactam mixtures preferably have a composition of 40 to 90% by weight of water and, more precisely, of 50 to 80% of water. These solutions in the water/caprolactam mixture are clear, stable, generally of low viscosity and therefore easy to handle. Moreover, they exhibit the advantage that they can be employed directly in the usual processes for the polycondensation of polyamides.

Another embodiment of the invention features the use of pure caprolactam as the solvent medium. In this case, it is necessary to operate at a temperature which is greater than 67° C., but which must not be too high because the rate of chemical evolution of the salt then makes it virtually impossible to suitably adjust the stoichiometry. The reaction will preferably be carried out at between about 70° and 75° C. and with salt concentrations of between 5 and 95% by weight, and preferably between 5 and 50% by weight.

Still another embodiment consists of using, as the solvent medium, mixtures of water and a volatile alcohol which has a boiling point below 120° C., and preferably below 100° C., or forms, with the water, an azeotrope having a boiling point below 100° C. Among the water/alcohol mixtures, water/methanol mixtures having a water content of 30% by weight to 60% by weight, and preferably 40 to 50%, water/ethanol mixtures having a water content of 30% by weight to 60% by weight, water/isopropanol mixtures having a water content of 5% by weight to 90% by weight, and preferably 25 to 75%, or water/butanol mixtures having a water content of 30% to 60% by weight are the preferred. Salt concentrations of between 30 and 70% by weight can easily be obtained with these mixtures.

However, the use of these solutions involves the removal of the alcohol before carrying out the polycondensation. It will then suffice to distill the alcohol or its azeotrope with water at atmospheric pressure.

A further aspect of the process according to the invention is the monitoring which makes it possible to adjust the stoichiometry of the concentrated salt solutions. It has been found that this monitoring can advantageously be carried out by measuring the pH, at about 20° C., of a salt solution which is not necessarily that obtained during the salification. The operation is usually carried out with solutions having a salt concentration which is generally between 5 and 50%, and preferably between 5 and 20%. The best results are obtained with a concentration of about 10%. The solvent medium used necessarily comprises a variable amount of water and a solvent which is preferably an alcohol, a diol or caprolactam. The preferred mixtures are binary mixtures, but it is also possible to use ternary mixtures of the same solvents. The respective amounts of this cosolvent or these co-solvents vary depending on the nature of the latter, but are generally between 15 and 80% by weight, and preferably from 30 to 70%.

In the case of ethanol, from 30 to 55% and preferably from 45 to 55% by weight of ethanol is used. In the case of isopropanol, from 15 to 85% of isopropanol, and preferably from 40 to 80% by weight, is used. In the case of butanol, the butanol content is preferably between 50 and 90%, and preferably from 70 to 80% by weight.

In the case of ethylene glycol, this content is between 25 and 80%, and preferably from 40 to 70% by weight of ethylene glycol.

In the case of caprolactam, the caprolactam content of the solution will preferably be selected between 10 and 50%, and is preferably from 20 to 40%.

The pH corresponding to the stoichiometric salt varies depending on the nature of the solvent medium and the concentration of the solution. This pH can easily be determined by potentiometry in the solvent medium in question and at the selected concentration.

Having determined the pH of the salt solution, it is then easy to obtain the stoichiometry of the solution intended for the polycondensation by adding the required reagents.

This solution can then be directly employed in the polycondensation process, together with other constituents and additives of the polymer, if desired.

The main constituent which can be added is caprolactam, but it is also possible to add small amounts of other monomers which can co-condense with the caprolactam. It is also possible to introduce other additives such as monobasic acids or monofunctional amines acting as chain terminators, in fairly low proportions which are generally less than 0.5 mol % and even less than 0.2 mol %, relative to the monomers. It is also possible to introduce nucleating agents, lubricants, colorants, and the like.

The copolyamides according to the invention can be obtained by various processes which are generally used for condensing polymers. Two processes are particularly suitable.

In the case of copolyamides in which the monomers contain less than about 90% by weight of caprolactam, the preferred process consists in gradually raising the temperature of the reaction medium to about 250° to 300° C. at atmospheric pressure, ensuring that the solvents and the water of polycondensation distil uniformly. The polycondensation is then terminated by maintaining the molten mass at the same temperatures for a period varying from about 1 hour to a few hours.

A second process which can be applied to all the copolyamides according to the invention, but which will be preferred for those in which the monomers contain more than 90% by weight of caprolactam, consists in heating the reaction mass, at atmospheric pressure, in order to remove, by distilling the reaction mixture, the non-aqueous solvents which may be present and also a certain part of the water present. The mass, which preferably contains between 10 and 20% by weight of water, is then heated to a high temperature of the order of 200° to 250° C. under an autogenous pressure on the order of 5 to 20 bars. The water is then distilled under pressure and the polycondensation is allowed to proceed, the pressure being gradually diminished to atmospheric pressure while raising the temperature to about 250° to 300° C.

The polycondensation is terminated by curing, as in the above process.

In both processes, the curing time can be reduced by sweeping dry nitrogen over the molten polymer or, preferably, by gradually applying a vacuum. This latter technique exhibits the additional advantage in that it removes a large part of the monomers which have not undergone polycondensation. If the reaction is not carried out by this method, the residual monomers and certain low molecular weight oligomers can be removed by washing the polymer with hot water.

Products obtained by the process according to the invention exhibit numerous advantages, inter alia, a flexibility and a permanent elasticity which can be controlled by the proportion of dimeric acid, while retaining the mechanical characteristics of break under tension which are equivalent to those of polycaprolactam, an excellent impact strength under ambient conditions, and improved dimensional stability and resistance to water, and a good resistance to aromatic and aliphatic chlorohydrocarbons. Furthermore, an improved transparency is found, relative to that of polycaprolactam. The resistance to hydrolysis is good.

The suitability for molding, extrusion or spinning is good. These polymers also possess a good thermomechanical strength, due to their high melting points, and a degree of crystallinity.

Copolyamides of this type can be used successfully in the fields of molding, injection molding, extrusion or spinning. It is possible to envisage various applications requiring the specific properties of these copolymers in fields as varied as the mechanical, building, electrical household equipment or textile industries.

The test conditions of the copolymers obtained by the process according to the invention are indicated below:

The pH measurements were carried out at 20° C. using a Radiometer PHM 62 pH meter, graduated to a hundredth of a pH unit.

The pH values at the equivalence points were determined at 20° C. using a Radiometer PHM 62 pH meter, graduated to a hundredth of a pH unit, and under the dilution conditions used for the pH measurements.

The inherent viscosities of the polyamides were determined on a solution containing 0.5 g of dried polymer in about 100 ml of m-cresol at 25° C., using a capillary tube viscometer.

$\text{vinh. (dl/g)} = 1/c \; \text{Log} \; t/t_o$ c = exact concentration of the solution in g/dl
t = flow time of the solution in seconds
$t_o$ = flow time of the pure solvent in seconds (Draft ISO/R 307)

The glass transition temperatures of the polyamides were obtained by differential thermal analysis under nitrogen, using temperature variations of 10° C./minute.

The contents of products which could be extracted with hot water were determined in the following manner:

100 g of polyamide granules, dried to constant weight, are treated with 1 liter of softened water at 80° C. for 5 hours. The granules are rinsed, drained and then dried again to a constant weight p.

Content of extractables E % = 100 − p.

This method of operation also defines the washing conditions of the polymers.

After removing the products which could be extracted with hot water, the degree of whiteness of the polyamides was determined on granules (dimensions about 2 mm × 1 mm × 3 mm) using a ZEISS "ELREPHO" photoelectric photometer equipped with an anti-reflection dome and provided with illumination by means of an incandescent lamp.

Degree of whiteness % = 100 − Pe

Pe = excitation purity (%) deduced from the tristimulus values standardized by the C.I.E. The iodine number is the weight of iodine fixed by 100 g of product and is determined by the conventional method using WIJS' reagent.

The mechanical characteristics were determined on comparison test-pieces which had been molded by injection into a cold mold (15° C.) using a laboratory transfer press.

Before molding, the polyamides were dried at 110° C. in an oven for 5 hours, under a vacuum of about 10 mm Hg.

The molded test-pieces are stabilized for 1 hour at 100° C. in an inert atmosphere before being conditioned.

The test-pieces were conditioned in the following manner:

EH O: test-pieces maintained in a $P_2O_5$ desiccator at 25° C. for 24 hours after molding.

EH 50: test-pieces maintained in a desiccator containing a saturated solution of sodium dichromate at 25° C. until equilibrium is reached.

The hardness was measured on 80 mm × 10 mm × 4 mm molded bars using a Shore D hardness meter in accordance with draft ISO/R 868.

The mechanical bending characteristics were determined at 20° C. on 80 mm × 10 mm × 4 mm test-bars in accordance with draft ISO 178.

The mechanical tensile characteristics were determined at 20° C. on 2 mm thick H3 type test-pieces in accordance with French Standard Specification T 51 034 (traction speed 10 mm/minute) using an Instron type tensometer.

In order to further illustrate the present invention and the advantages thereof, the following specific examples are given, it being understood that same are intended only as illustrative and in nowise limitative. In the examples which follow, various batches of dimeric acid, marketed under the name "Empol 1010" by Unilever Emery (which is a saturated acid having 36 carbon atoms obtained by catalytic dimerization of unsaturated fatty acid having 18 carbon atoms), were used which did not contain any monobasic acid (monomer) detectable by gas phase chromatography of the methyl esters, or contained less than 0.1% of monobasic acid determined by this analytical method, and which had an iodine number of about 10.

EXAMPLE 1

Preparation of the salt of hexamethylenediamine with the dimeric fatty acid as a 50% strength solution in a 50/50 (by weight) mixture of water and isopropanol.

41,650 g of a dimeric fatty acid, containing 0.03% of monomer and about 3% of trimer (and marketed as "Empol 1010" by Unilever Emery), and 25,000 g of isopropanol were charged into a 150 liter reactor which was equipped with a propeller stirrer (three blades—speed of rotation was 300 revolutions/minute) and was capable of operating under a nitrogen atmosphere.

The mixture was homogenized and the free space in the reactor was purged with nitrogen. 8,349 g of pure hexamethylenediamine, previously dissolved in 25,000 g of softened water, were then uniformly introduced into the stirred mass over the course of about 1 hour.

The resultant clear solution was homogenized for about 30 minutes.

A small sample of about 10 cm³ was taken and diluted with a mixture of water and isopropanol (50/50 by weight) so as to bring the concentration of the salt to 10%. The pH value of this diluted solution was greater than that at the equivalence point.

600 g of Empol 1010 dimeric fatty acid, diluted with 300 g of isopropanol, and 300 g of softened water were introduced into the concentrated solution (50% strength). The solution was homogenized for 30 minutes and a further pH measurement was then conducted on a solution which had been diluted to 10% strength with the mixture of water and isopropanol (50/50 by weight). The pH value of the diluted solution was still greater than that at the equivalence point.

An additional 600 g of Empol 1010 dimeric fatty acid, diluted with 300 g of isopropanol, and 300 g of softened water were introduced into the concentrated solution. The solution was homogenized for 30 minutes and a further pH measurement was carried out on the diluted solution. The pH value of the diluted solution reached that at the equivalence point to within five hundredths of a pH unit.

The concentrated solution, adjusted in this manner, was withdrawn and kept under a nitrogen atmosphere at 25° C. Under these conditions, same was clear, homogeneous and stable and possessed an apparent viscosity of about 2 Poises.

EXAMPLE 2

Preparation of the salt of hexamethylenediamine with the dimeric fatty acid as a 33.3% strength solution in a 50/50 (by weight) mixture of water and caprolactam.

30,207 g of softened water, 30,207 g of caprolactam and 4,937 g of pure hexamethylenediamine were charged, under stirring, into the equipment described in Example 1.

The mixture was homogenized for about one hour and the free space in the reactor was purged with nitrogen.

25,270 g of an Empol 1010 dimeric fatty acid of Unilever Emery, which contained 0.065% of monomer, were uniformly introduced into the stirred solution over the course of about one hour. The mass was homogenized for 30 minutes to one hour.

A small sample was taken and diluted with a mixture of water and isopropanol (42.85/57.15 by weight) so as to bring the concentration of the salt to 10%. This diluted solution then had the following composition:

| | | |
|---|---|---|
| Salt of dimeric acid | 0.1 part | |
| Caprolactam | 0.1 part | |
| Water | 0.4 part | |
| Isopropanol | 0.4 part | |

The pH value of this solution was less than that at the equivalence point.

260 g of a 66.6% strength aqueous solution of hexamethylenediamine were introduced into the concentrated solution. The solution was homogenized for 30 minutes and a further pH measurement was then carried out on a solution which had been diluted so as to contain 10% of salt as above. The pH value of the diluted solution reached that at the equivalence point to within five hundredths of a pH unit.

The concentrated solution, adjusted in this manner, was withdrawn and kept at 25° C. under a nitrogen atmosphere. Under these conditions, same was stable, clear and homogeneous and possessed an apparent viscosity of about 1.5 Poises.

EXAMPLE 3

Preparation of the salt of hexamethylenediamine with the dimeric fatty acid as a 50% strength solution in molten caprolactam.

500 g of caprolactam were charged into a 2 liter reactor equipped with a system for heating by means of a thermostatically controlled oil bath, an anchor-type stirrer (speed of rotation was 100 revolutions/minute), a nitrogen circuit enabling operation under a nitrogen atmosphere, a thermometer and a 500 ml dropping funnel.

The free space in the reactor was purged with nitrogen and the mass was heated to 70° C. The stirring was started when the caprolactam was molten, and 85.34 g of pure hexamethylenediamine were then introduced into the stirred mass. Homogenization was carried out for about 15 minutes.

414.66 g of an Empol 1010 dimeric fatty acid of Unilever Emery, which contained 0.065% of monomer, were then uniformly introduced into the stirred mass by means of the dropping funnel, while the temperature of the mass was maintained below 80° C.

The mass was homogenized at 70°–75° C. for one hour after the addition of the dimeric acid had terminated.

A small sample was taken and diluted with a 78.75/21.25 mixture of water and caprolactam so as to bring the concentration of the salt to 10%. The pH value of this diluted solution was less than that at the equivalence point.

0.345 g of pure hexamethylenediamine and 0.345 g of caprolactam were added to the stirred mixture at 70°–75° C. The mass was homogenized at 70°–75° C. for 30 minutes and a further small sample was then taken and diluted to 10% strength, as above. The pH value of this solution reached that at the equivalence point to within five hundredths of a pH unit.

The concentrated solution, adjusted in this manner, was homogeneous and clear and possessed an apparent viscosity of about 3.5 Poises at 75° C., but crystallized at about 67° C. on cooling.

500 g of solution were removed while hot and immediately employed for preparing a copolyamide in accordance with Example 11.

150 g of softened water were uniformly introduced into the reactor containing the remainder of the solution. Homogenization was carried out while allowing the mixture to cool. A clear, homogeneous and stable solution, which possessed an apparent viscosity of about 2 Poises, was finally obtained at 25° C.

EXAMPLE 4

Preparation of the salt of hexamethylenediamine with the dimeric fatty acid as a 70% strength solution in a 25/75 (by weight) mixture of water and isopropanol.

4,074 g of an Empol 1010 dimeric fatty acid of Unilever Emery (which contained 0.03% of monomer) and 1,050 g of isopropanol were charged into a 10 liter reactor equipped with a frame-type stirrer (speed of rotation was 60 revolutions/minute), a 1 liter dropping funnel and a circuit enabling operation under a nitrogen atmosphere.

The mixture was homogenized and the free space in the reactor was purged with nitrogen. 826 g of pure hexamethylenediamine, previously dissolved in a mixture containing 525 g of softened water and 525 g of isopropanol, were then uniformly introduced into the stirred mass over the course of one hour.

The solution obtained was homogenized for one hour.

A small sample was taken and diluted with a mixture of water and isopropanol (51.25/48.75 by weight) so as to bring the concentration of the salt to 10%). This diluted solution then had the following composition:

| | | |
|---|---|---|
| Salt of dimeric acid | 0.1 part | |
| Water | 0.45 part | |
| Isopropanol | 0.45 part | |

The pH value of this diluted solution was less than that at the equivalence point.

5.85 g of a 70% strength solution of hexamethylenediamine in the 25/75 mixture of water and isopropanol were then introduced into the concentrated solution. The solution was homogenized for 30 minutes and a further pH measurement was then carried out on a solution which had been diluted to 10% strength, as above. The pH value of the diluted solution reached at the equivalence point to within five hundredths of a pH point.

The concentrated solution, adjusted in this manner, was withdrawn and kept at 25° C. under a nitrogen atmosphere. Under these conditions, same was clear, homogeneous and stable and possessed an apparent viscosity of about 17 Poises.

EXAMPLE 5

Preparation of the salt of hexamethylenediamine with the dimeric fatty acid as a 35% strength solution in a 65/35 (by weight) mixture of water and caprolactam.

633.75 g of softened water, 341.25 g of caprolactam and 88.33 g of pure hexamethylenediamine were charged into a 2 liter reactor equipped with an anchor-type stirrer (speed of rotation was 100 revolutions/minute), a 500 ml dropping funnel, a thermometer and a nitrogen circuit enabling operation under a nitrogen atmosphere.

The mixture was homogenized for about one hour and the free space in the reactor was purged with nitrogen. 436.67 g of a batch of an Empol 1010 dimeric fatty acid of Unilever Emery, which contained no monomer detectable by chromatography of the methyl esters, were uniformly introduced into the stirred solution over the course of about one hour. The mass was homogenized for one hour.

A small sample was taken and diluted with a mixture of water and caprolactam (77.6/22.4 by weight) so as to bring the concentration of the salt to 10%. This diluted solution then had the following composition:

| | | |
|---|---|---|
| Salt of dimeric acid | 0.1 | part |
| Caprolactam | 0.225 | part |
| Water | 0.675 | part |

The pH value of this diluted solution was less than that at the equivalence point.

0.77 g of a 33% strength solution of hexamethylenediamine in the 65/35 mixture of water and caprolactam was introduced into the concentrated solution. The solution was homogenized for 30 minutes and a further pH measurement was carried out on a solution which had been diluted so as to contain 10% of salt as above. The pH value of the diluted solution reached that at the equivalence point to within five hundredths of a pH unit.

The concentrated solution, adjusted in this manner, was kept at 25° C. under a nitrogen atmosphere. Under these conditions, same was stable, clear, homogeneous and fluid.

EXAMPLE 6

Preparation of the salt of hexamethylenediamine with the dimeric fatty acid as a 50% strength solution in a 50/50 by weight mixture of water and ethanol.

The equipment described in Experiment No. 1 was used:

33,230 g of an Empol 1010 dimeric fatty acid of Unilever Emery (which contains 0.03% of monomer) and 20,000 g of pure ethanol were charged into the reactor.

The mixture was homogenized and the free space in the reactor was purged with nitrogen. 6,770 g of pure hexamethylenediamine, previously dissolved in 20,000 g of softened water, were then uniformly introduced into the stirred mass over the course of one hour. The resultant clear solution was homogenized for one hour.

A small sample was taken and diluted with a mixture of water and ethanol (50/50 by weight) so as to bring the concentration of the salt to 10%. The pH value of this diluted solution reached that at the equivalence point to within five hundredths of a pH unit.

The concentrated solution, adjusted in this manner, was withdrawn and kept at 25° C. under a nitrogen atmosphere. Under these conditions, same was clear, homogeneous and stable and possessed an apparent viscosity of about 2 Poises.

EXAMPLE 7

Preparation of the salt of hexamethylenediamine with the dimeric fatty acid as a 50% strength solution in a 40/60 (by weight) mixture of water and n-butanol.

The equipment described in Experiment No. 3 was used:

500 g of an Empol 1010 dimeric acid of Unilever Emery, which contained 0.03% of monomer, and 361.2 g of n-butanol were charged into the reactor. The mixture was homogenized and the free space in the reactor was purged with nitrogen.

102 g of pure hexamethylenediamine, previously dissolved in 240.8 g of softened water, were introduced uniformly into the stirred solution over the course of 15 minutes. The clear solution obtained was homogenized for one hour.

A 10 g sample of the solution was taken and diluted by adding 30.75 g of n-butanol and 9.25 g of softened water, under stirring. The pH value of this diluted solution was greater than that at the equivalence point.

1.2 g of Empol 1010 dimeric fatty acid, diluted with 0.7 g of n-butanol, and 0.5 g of softened water were introduced into the concentrated solution.

The solution was homogenized for 30 minutes and a further pH measurement was then carried out on a solution which had been diluted as above. The pH value of the diluted solution reached that of the equivalence point to within five hundredths of a pH unit.

The concentrated solution, adjusted in this manner, was kept at 25° C. under a nitrogen atmosphere. Under these conditions, same was clear, homogeneous and stable and possessed an apparent viscosity of about 2 Poises.

EXAMPLE 8

(a) Experiment for the preparation of the salt of hexamethylenediamine with the dimeric fatty acid as a 40% strength solution in a 25/75 (by weight) mixture of water and caprolactam.

The equipment described in Example 3 was used:

1,000 g of a batch of an Empol 1010 dimeric acid of Unilever Emery and 677 g of caprolactam, previously dissolved in 225.5 g of softened water, were charged into the reactor. The free space in the reactor was purged with nitrogen. The mixture was stirred slowly. The mass obtained was heterogeneous. A mixture of 677 g of caprolactam, 203.5 g of pure hexamethylenediamine and 225.5 g of softened water was then introduced into the stirred mass over the course of 15 minutes.

The mass was stirred for one hour. A fairly fluid heterogeneous mass was obtained which, when allowed to stand at 25° C., rapidly separated out into two immiscible phases. These two immiscible phases remained when the mass was diluted at 25° C. with the mixture (25/75) of water and caprolactam in order to obtain overall salt concentrations of between 10% and 40%.

(b) Experiment for the preparation of the salt of hexamethylenediamine with the dimeric fatty acid as a 40% strength solution in softened water.

The equipment described in Example 3 was used:

300 g of a batch of an Empol 1010 dimeric acid of Unilever Emery and then a solution of 61 g of pure hexamethylenediamine in 541.5 g of softened water were charged into the reactor. The free space in the reactor was purged with nitrogen.

The mass obtained was heterogeneous and difficult to stir. The temperature of the mass was raised to 80° C. over the course of 15 minutes. The mass was then pasty and difficult to stir and yielded a gel on cooling.

(c) Experiment for the preparation of the salt of hexamethylenediamine with the dimeric fatty acid as a 40% strength solution in a 90/10 mixture of water and isopropanol.

The equipment described in Experiment No. 3 was used:

300 g of a batch of an Empol 1010 dimeric acid of Unilever Emery and then 54.2 g of isopropanol were charged into the reactor. The free space in the reactor was purged with nitrogen and the mixture was homogenized. 61 g of pure hexamethylenediamine, previously dissolved in 487.3 g of softened water were uniformly introduced into the stirred mixture over the course of one hour.

Homogenization was carried out for one hour. The mass obtained was heterogeneous and separated out into two immiscible phases when same was allowed to stand at 25° C.

EXAMPLE 9

Preparation of a 70/30 6,6-copolyamide, with EMPOL 1010.

The equipment comprised:

a 150 liter reactor equipped with a system for heating by means of a heat-transfer fluid, a stirrer (propeller type with three blades—speed of rotation was 300 revolutions/minute), a distillation column and a system enabling purging with nitrogen, which was connected by a heat-insulated pipe to:

a 100 liter autoclave equipped with a system for heating by means of a heat-transfer fluid, a frame-type stirrer rotating at 16 revolutions/minute, a circuit for condensing and collecting the volatile products, which also enabled application of a vacuum by means of steam ejectors, and a system enabling purging with nitrogen.

27,424 g of the solution of the salt of hexamethylenediamine with the dimeric fatty acid, prepared as a 50% strength solution in a mixture (50/50) of water and isopropanol as in Example 1, were introduced into the 150 liter reactor, preheated to 50° C. Homogenization was carried out for 15 minutes and 32,000 g of caprolactam and 30 ml of a 6% strength solution of an anti-foam agent in tetrachloromethylene were added. 3 nitrogen purges were carried out by applying a pressure of 3 bars and then releasing the pressure. The temperature of the stirred mass was gradually raised to 130° C. over the course of about two hours, while ensuring uniform distillation through the column. The temperature of the mass was kept at about 130° C. until the weight of distillate reached 7,800 g. The temperature of the mass was then raised uniformly to about 235° C., while maintaining uniform distillation through the column.

The stirring was then stopped, a nitrogen pressure of 2 bars was applied and the mass was discharged from the reactor into the 100 liter autoclave which had been preheated to 250° C. and purged with nitrogen.

The temperature of the stirred mass in the autoclave was gradually raised to 260° C. over the course of 30 minutes and then to 270° C. over the course of two hours.

A pressure of 40 mm Hg was then established gradually over the course of about 30 minutes, while continuing to homogenize the mass at 260° C.–270° C.

The stirring was stopped, a nitrogen pressure of 5 bars was established in the autoclave and the polymer was withdrawn. The latter, extruded from the autoclave in the form of a strip, was cooled by passing same through a bath of cold water, granulated and dried.

The polymer obtained was transparent and slightly opalescent and possessed the following characteristics:

$v$inh. = 1.164 dl/g

E% = 1.54

Melting point = 199° C.

Crystallization point on cooling: 137° C.

Degree of whiteness = 85%

The mechanical characteristics, measured on stabilized and conditioned injection-molded test-pieces, are given in the tables below.

EXAMPLE 10

Preparation of a 90/10 6,6-copolyamide, with Empol 1010.

The equipment described in Example 9 was used:

9.047 g of the solution of the salt of hexamethylenediamine with the dimeric fatty acid, prepared as a 50% strength solution in a mixture (50/50) of water and isopropanol as in Example 1, were introduced into the 150 liter reactor, preheated to 50° C. Homogenization was carried out for 15 minutes, while heating the mass to 60° C. 10,000 g of softened water, 40,713 g of caprolactam and 30 ml of a 6% strength solution of an anti-foam agent in tetrachloroethylene were then introduced. Homogenization was carried out for 10 minutes and three nitrogen purges were carried out by applying a pressure of 3 bars and then releasing the pressure.

The temperature of the stirred mass was gradually rasied to 130° C. over the coures of about two hours, while ensuring uniform distillation through the column. The temperature of the mass was kept at about 130° C. until the weight of distillate reached 9,660 g.

The stirring was then stopped, a nitrogen pressure of 2 bars was applied and the mass was discharged from the reactor into the 100 liter autoclave which had been preheated to 200° C. and purged with nitrogen.

The stirred mass was heated to 250° C. under autogenous pressure over the course of one hour. A pressure of about 10 bars was reached. Uniform distillation was carried out under a pressure of 10 bars until the temperature of the mass reached 268° C. in about one hour. The pressure was uniformly released to atmospheric pressure over the course of 45 minutes, while keeping the temperature of the mass at 268° C.–270° C. The mass was kept at 268° C.–270° C. under atmospheric pressure for one hour, under stirring, and a pressure of 18 mm Hg was then gradually established over the course of 40 minutes, while keeping the mass at 265° C.–270° C. and under stirring.

The stirring was stopped, a nitrogen pressure of 5 bars was established in the autoclave and the polymer was withdrawn. The latter, extruded from the autoclave in the form of a strip, was cooled by passing it through a bath of cold water, granulated and dried.

The polymer obtained was transluscent and possessed the following characteristics:
vinh. = 1.21 dl/g
E% = 0.54
Melting point = 213° C.
Crystallization point on cooling = 163° C.

The mechanical characteristics, measured on stabilized and conditioned injection-molded test-pieces, are given in the tables below.

EXAMPLE 11

Preparation of a 50/50 6,6-copolyamide, with Empol 1010.

The equipment was a 1 liter autoclave equipped with a system for heating by means of a heat-transfer fluid, a spiral stirrer (speed of rotation was 10 revolutions/minute to 75 revolutions/minute), a system enabling application of a nitrogen pressure and a circuit enabling condensation and collection of the volatile products.

450 g of a solution of the salt of hexamethylenediamine with the dimeric fatty acid, prepared as a 50% strength solution in molten caprolactam in accordance with Example 3, were charged into the autoclave, preheated to 75° C.

Homogenization was carried out for 10 minutes (50 revolutions/minute) and three nitrogen purges were carried out by applying a pressure of 3 bars and then releasing pressure. After having carried out the third purge, a nitrogen sweep of about 2 liters per hour was established.

The temperature of the stirred mass was uniformly raised to 270° C. over the course of two hours. While collecting the distillate, the first fractions of which appeared when the temperature of the mass reached about 190° C.

The mass was homogenized at 270° C. for three hours, while sweeping nitrogen, during which time the stirring was gradually diminished to 20 revolutions/minute. The nitrogen sweep and the stirring were stopped. A nitrogen pressure of 5 bars was established in the autoclave and the polymer was withdrawn. The latter, extruded from the autoclave in the form of a strand, was cooled by passing it through a bath of cold water, granulated and dried.

The polymer obtained was transparent and possessed the following characteristics:
vinh. = 1 dl/g
E% = 3.9
Melting point = 175° C.
Crystallization point on cooling = 112° C.

The polymer obtained was washed with water at 80° C. under the conditions defined above. The mechanical characteristics of the washed polymer, measured on stabilized and conditioned injection-molded test-pieces, are given in the tables below.

EXAMPLE 12

Preparation of a 80/20 6,6-copolyamide, with Empol 1010.

The equipment was a 1 liter autoclave equipped with a system for heating by means of a heat-transfer fluid, a spiral stirrer (speed of rotation was 10 revolutions/minute to 75 revolutions/minute), a distillation column, a system enabling application of a nitrogen pressure and a circuit enabling condensation and collection of the volatile products.

300 g of a solution of the salt of hexamethylenediamine with the dimeric fatty acid, prepared as a 33.3% strength solution in a mixture (50/50) of water and caprolactam as in Example 2, were charged into the autoclave, preheated to 50° C.

Homogenization was carried out for 10 minutes (50 revolutions/minute) while heating the mass to 60° C. 300 g of caprolactam were introduced, under stirring, homogenization was carried out for 10 minutes and three nitrogen purges were carried out by applying a pressure of 3 bars and then releasing the pressure. After having carried out the third purge, a nitrogen sweep of about 2 liters per hour was established.

The temperature of the stirred mass was gradually raised to 270° C. over the course of 90 minutes, while ensuring uniform distillation through the column (distillation starting when the temperature of the mass reached about 110° C.).

The mass was homogenized at 270° C. for 3 hours, while sweeping nitrogen, during which time the stirring was gradually diminished to 20 revolutions/minute. The nitrogen sweep and the stirring were stopped. A nitrogen pressure of 5 bars was established in the autoclave and the polymer was withdrawn. The latter, extruded from the autoclave in the form of a strand, was cooled by passing it through a bath of cold water, granulated and dried.

The polymer obtained was slightly transluscent and possessed the following characteristics:
vinh. = 1.06 dl/g
E% = 5.9
Melting point = 206° C.
Crystallization point on cooling: 158° C.
Degree of whiteness = 91%

The polymer obtained was washed with water at 80° C. under the conditions defined above. The mechanical characteristics of the washed polymer, measured on stabilized and conditioned injection-molded test-pieces, are given in the tables below.

EXAMPLES 13 TO 18

Preparation of a 6,6-copolyamide, with Empol 1010.

Various copolyamides were prepared from solutions of the hexamethylenediamine salt of Empol 1010, obtained in accordance with the methods of operation described in the Examples 1 to 6 and by analogous processes to those described in Examples 9 to 12. The term analogous processes is to be understood as meaning processes in which the temperature and pressure programmings are similar, the charges and the amounts of distillate being adjusted according to the composition of the polymers to be obtained.

The characteristics of the polymers obtained are summarized in the tables below.

Table 1 reflects the characteristics relating to the preparation of the copolymers and also their thermal characteristics.

Table 2 provides the mechanical characteristics of the dry copolymers at EH O.

Table 3 provides the mechanical characteristics of the copolymers conditioned at EH 50.

Table 4 provides the resistance of the copolymers to solvents by measuring the solvent uptake and the mechanical characteristics after immersion for 21 days in the solvents in question.

TABLE 1

Characteristics Of The 6,6-Copolyamides With Empol 1010

| Ex. No. | Composition Of The Copolyamide (%) 6 | Composition Of The Copolyamide (%) 6 Empol 1010 | Process Of Preparation Hexamethylenediamine[1] Salt Of Empol 1010 In Accordance With Example No. | Process Of Preparation Polycondensation In Accordance With Example No. | Process Of Preparation Pressure In mm Hg At The End Of Poly-Condensation | Characteristics Of The Copolyamide $\nu$ Inh. dl/g | Characteristics Of The Copolyamide Melting Point °C. | Characteristics Of The Copolyamide Crystallization Point On Cooling °C. | E %[2] |
|---|---|---|---|---|---|---|---|---|---|
| 13 | 95 | 5 | 4 | 10 | 760 | 1.18 | 218 | 178 | 0 |
| 14 | 95 | 5 | 1 | 10 | 60 | 1.34 | 214 | 167 | 1.68 |
| 15 | 90 | 10 | 1 | 12 | 760 | 1.12 | 212.5 | 168 | 0 |
| 10 | 90 | 10 | 1 | 10 | 18 | 1.21 | 213 | 163 | 0.54 |
| 12 | 80 | 20 | 2 | 12 | 760 | 1.11 | 209 | 160 | 0 |
| 16 | 80 | 20 | 6 | 9 | 70 | 1.21 | 205 | 153 | 2.66 |
| 17 | 70 | 30 | 5 | 12 | 760 | 1.02 | 201 | 148 | 0 |
| 9 | 70 | 30 | 1 | 9 | 40 | 1.16 | 199 | 137 | 1.54 |
| 11 | 50 | 50 | 3 | 11 | 760 | 1.02 | 176 | 104 | 0 |
| 18 | 50 | 50 | 2 | 12 | 40 | 1.04 | 174 | 112 | 1.96 |
| Technyl C 216 polyamide 6 of Rhone-Poulenc Polymers | | | | | | 1.12 | 225 | 173 | 0.7 |
| Rilsan N of ATO Chimie | | | | | | | 162 | 102 | |

[1] Empol 1010 salt 6 = Salt of hexamethylenediamine with the Empol 1010 dimeric fatty acid of Unilever Emery
[2] E = O The polymers were washed under the conditions defined above. It is found that the inherent viscosities of the copolyamides were analogous to that of an industrial polyamide 6. The melting points of the copolyamides remained high.

TABLE 2

Characteristics Of The 6,6-Copolyamides With Empol 1010
Characteristics Of The Dry Polymers E H O

| Ex. NO. | Tg°C. | Shore D Hardness | Bending Modulus DaN/mm² | Flow Threshold Stress DaN/mm² | Stress At Break DaN/mm² | Elongation At Break % |
|---|---|---|---|---|---|---|
| 13 | | | 272 ± 5 | | | |
| 14 | 28 | 85 ± 0.5 | 160 ± 16 | 6.2 ± 0.2 | 6.7 ± 0.3 | 420 ± 60 |
| 15 | | | 218 ± 12 | | | |
| 10 | 36 | 85 ± 0.5 | 200 ± 10 | 5.8 ± 0.1 | 6.9 ± 0.4 | 510 ± 70 |
| 12 | 25 | 80 ± 0.6 | 142 ± 5 | 4.6 ± 0.1 | 7.35 ± 0.3 | 590 ± 60 |
| 16 | | 80 ± 0.5 | 82 ± 9 | 3.8 ± 0.1 | 7.8 ± 0.1 | 570 ± 20 |
| 17 | 21 | 76 ± 0.6 | 101 ± 6 | 3.9 ± 0.1 | 7.6 ± 0.5 | 660 ± 70 |
| 9 | 16 | 78 ± 0.5 | 86 ± 7 | 3.7 ± 0.1 | 7.1 ± 0.4 | 590 ± 40 |
| 11 | −3 | 69 ± 0.5 | 29.3 ± 1.2 | 2.65 ± 0.1 | 5.5 ± 0.1 | 670 ± 40 |
| 18 | −4 | 70 ± 0.5 | 29.9 ± 2.4 | 2.25 ± 0.2 | 5.6 ± 0.4 | 620 ± 50 |
| Polyamide 6 | 42 | 86 ± 0.5 | 290 ± 10 | 6.9 ± 0.1 | 6.5 ± 0.4 | 400 ± 50 |
| Rilsan N | 3 | 68 ± 0.2 | 20 ± 2 | 1.8 ± 0.3 | 5.1 ± 0.5 | 600 ± 55 |

The values are given with a confidence interval for a probability of 0.95.
It is noted that the bending modulae which represent the flexibility can be controlled by the dimeric acid content, but the characteristics at break remain at the level of those of the industrial polyamide.

TABLE 3

Characteristics Of the 6,6-Copolyamides With Empol 1010
Characteristics of the Polymers At EH 50

| EX. NO. | Moisture Uptake | Tg°C. | Shore D Hardness | Bending Modulus DaN/mm² | Flow Threshold Stress DaN/mm² | Stress At Break DaN/mm² | Elongation At Break % |
|---|---|---|---|---|---|---|---|
| 12 | 1.57 | −9 | 70.1 ± 0.3 | 48.5 ± 2 | 2.9 ± 0.2 | 7.3 ± 0.5 | 690 ± 60 |
| 17 | 1.2 | −8 | 71 ± 0.5 | 38.8 ± 1.5 | 3.1 ± 0.2 | 6.8 ± 0.45 | 710 ± 70 |
| 11 | 0.42 | −18 | 63.4 ± 0.4 | 25.6 ± 0.9 | 1.7 ± 0.1 | 4.7 ± 0.5 | 610 ± 70 |
| Polyamide 6 | 2.5 | −3 | 77 ± 0.2 | 125 ± 3 | 5.0 ± 0.2 | | 470 ± 20 |
| Rilsan N | 0.66 | −9 | 63.2 ± 0.2 | 16 ± 0.5 | 1.4 ± 0.5 | 4.5 ± 0.6 | 340 ± 40 |

The values are given with a confidence interval of 0.95.

TABLE 4

Characteristics of The 6,6-Copolyamides With Empol 1010
Characteristics of The Dry Polyamides 8.2 Immersion For 21 Hours In After Solvents At 25° C.

| | HEXANE | | | | TRICHLOROETHYLENE | | | | TOLUENE | | | |
|---|---|---|---|---|---|---|---|---|---|---|---|---|
| | | Mechanical Tensile Characteristics | | | | Mechanical Tensile Characteristics | | | | Mechanical Tensile Characteristics | | |
| EX. NO. | Solvent Uptake % | Flow threshold stress DaN/mm² | Stress at break DaN/mm² | Elongation at break % | Solvent Uptake % | Flow threshold stress DaN/mm² | Stress at tion at break DaN/mm² | Elongation at break % | Solvent Uptake % | Flow thresh break stress DaN/mm² | Stress at tion at break DaN/mm² | Elongation break % |
| 14 | 0.6 | 4.4 ± 0.1 | 6.3 ± 0.6 | 420 ± 60 | 3.3 | 3.6 ± 0.2 | 7.4 ± 0.3 | 540 ± 70 | 0.9 | | | |
| 10 | 0.55 | 4.9 ± 0.2 | 7.4 ± 0.3 | 520 ± 60 | 6.5 | 2.6 ± 0.1 | 7.7 ± 0.4 | 750 ± 50 | 1.4 | | | |
| 12 | 0.3 | 4.2 ± 0.2 | 8.2 ± 0.5 | 600 ± 70 | 15.6 | 2.4 ± 0.2 | 6.3 ± 0.4 | 670 ± 60 | 3.1 | 3.2 ± 0.2 | 7.0 ± 0.2 | 580 ± 70 |
| 16 | 1.2 | 2.9 ± 0.3 | 8.5 ± 1 | 750 ± 70 | 18.5 | 2.0 ± 0.2 | 6.7 ± 0.6 | 640 ± 70 | 6.4 | | | |
| 17 | 0.7 | 3.5 ± 0.1 | 7.7 ± 0.6 | 680 ± 40 | 23 | 1.9 ± 0.05 | 4.5 ± 0.3 | 590 ± 60 | 5.6 | 2.2 ± 0.2 | 5.6 ± 0.5 | 670 ± 70 |
| 9 | 1.55 | 3.1 ± 0.3 | 6.5 ± 0.6 | 530 ± 70 | 29 | 1.45 ± 0.15 | 5.4 ± 0.3 | 760 ± 70 | 9.7 | | | |
| 11 | 5.7 | 1.75 ± 0.2 | 4.1 ± 0.3 | 640 ± 70 | 33.1 | 1.2 ± 0.05 | 2.5 ± 0.2 | 450 ± 60 | 12.6 | 1.4 ± 0.1 | 3.1 ± 0.1 | 610 ± 40 |
| 18 | 5.7 | 1.5 ± 0.15 | 4.6 ± 0.4 | 660 ± 50 | 38.5 | 1.1 ± 0.1 | 2.7 ± 0.2 | 450 ± 50 | 13.3 | | | |
| Polyamide 6 | 0.75 | 5.9 ± 0.4 | 7.6 ± 1 | 470 ± 80 | 2.05 | 4.45 ± 0.6 | 7.8 ± 1.2 | 550 ± 80 | 1.3 | | | |
| Rilsan | 4.2 | 1.25 ± 0.07 | 4.0 ± 0.3 | 630 ± 60 | 43 | 0.8 ± 0.03 | 1.9 ± 0.2 | 500 ± 70 | 15.6 | 0.9 ± 0.03 | 2.5 ± 0.03 | 540 ± 50 |

The values are given with a confidence interval for a probability of 0.95.
It is found that, with respect to the solvents, the copolyamides possessed a very satisfactory resistance which was greater than that of Rilsan N and, in certain cases, was of the same order as that of industrial polyamide 6.

While the invention has now been described in terms of various preferred embodiments and illustrated with respect to certain examples, it will be apparent to the skilled artisan that various omissions, substitutions, modifications and the like may be made without departing from the spirit of the invention. Accordingly, it is intended that the scope of the present invention be limited only by the following claims.

What is claimed is:

1. A polymerizable composition of matter comprising (1) caprolactam, (ii) a dimeric fatty acid, and (iii) hexamethylenediamine, said dimeric fatty acid (ii) having an iodine number less than 30, containing less than about 0.5% by weight of its monobasic fatty acid precursor, and not more than 5% by weight of such acid having a basicity of greater than 2, the said dimeric fatty acid (ii) and the hexamethylenediamine (iii) being present in the composition as a solvent solution of the stoichiometrically balanced salt thereof, and said composition comprising from 40 to 95% by weight caprolactam and from 5 to 60% by weight of the stoichiometrically balanced salt.

2. The composition of matter as defined by claim 1, the stoichiometrically balanced salt being dissolved in a solvent selected from the group comprising water and a lower alkanol, water and caprolactam, and caprolactam itself.

3. The composition of matter as defined by claims 1 or 2, the stoichiometry of the salt having been adjusted to balance via pH determination on a solvent solution thereof.

4. The composition of matter as defined by claim 3, said pH determination being on a salt solution in a solvent selected from the group consisting of water an an alkanol, water and a diol, and water and caprolactam.

5. The composition of matter as defined in claim 1, said dimeric fatty acid (ii) essentially consisting of a saturated dimer of a fatty acid having 18 carbon atoms.

6. The composition of matter as defined by claim 2, said salt being in concentrated solution containing from about 30 to 70% by weight solids, at about 25° C., in a solvent mixture of water and caprolactam, said solvent mixture containing from about 40 to 90% by weight water.

7. The composition of matter as defined by claim 6, said solvent mixture containing from about 50 to 80% by weight water.

8. The composition of matter as defined by claim 2, said salt being in concentrated solution containing from about 30 to 70% by weight solids, at about 25° C., in a solvent mixture of water and an alkanol having from 1 to 4 carbon atoms, said solvent mixture containing from about 30 to 60% by weight water.

9. The composition of matter as defined by claim 8, said solvent mixture containing from about 40 to 50% by weight water.

10. The composition of matter as defined by claim 9, wherein the alkanol comprises methanol.

11. The composition of matter as defined by claim 2, said salt being in concentrated solution containing from about 30 to 70% by weight solids, at about 25° C., in a solvent mixture of water and isopropanol, said solvent mixture containing from about 5 to 90% by weight water.

12. The composition of matter as defined by claim 11, said solvent mixture containing from about 25 to 75% by weight water.

13. The composition of matter as defined by claim 2, said salt being in concentrated solution containing from about 5 to 95% by weight solids, in molten caprolactam.

14. The composition of matter as defined by claim 3, the pH determination and stoichiometric balance being on a solution containing from about 5 to 50% by weight solids, in a binary or ternary solvent mixture of water and a member selected from the group consisting of an alkanol, a diol and caprolactam.

15. The composition of matter as defined by claim 14, said solution containing from about 5 to 20% by weight solids.

16. The composition of matter as defined by claim 14, said solvent mixture comprising water and ethanol, and containing from about 30 to 55% by weight ethanol.

17. The composition of matter as defined by claim 16, said solvent mixture containing from about 45 to 55% by weight ethanol.

18. The composition of matter as defined by claim 14, said solvent mixture comprising water and isopropanol, and containing from about 15 to 85% by weight isopropanol.

19. The composition of matter as defined by claim 18, said solvent mixture containing from about 40 to 80% by weight isopropanol.

20. The composition of matter as defined by claim 14, said solvent mixture comprising water and butanol, and containing from about 50 to 90% by weight butanol.

21. The composition of matter as defined by claim 20, said solvent mixture containing from about 70 to 80% by weight butanol.

22. The composition of matter as defined by claim 14, said solvent mixture comprising water and ethylene glycol, and containing from about 25 to 80% by weight ethylene glycol.

23. The composition of matter as defined by claim 22, said solvent mixture containing from about 40 to 70% by weight ethylene glycol.

24. The composition of matter as defined by claim 14, said solvent mixture comprising water and caprolactam, and containing from about 10 to 50% by weight caprolactam.

25. The composition of matter as defined by claim 24, said solvent mixture containing from about 20 to 40% by weight caprolactam.

26. An essentially linear, flexible copolyamide having a tensile strength in excess of 5 DaN/mm$^2$, said copolyamide comprising the polycondensation product of the composition of matter as defined by claims 1 or 2.

27. A shaped article comprising the copolyamide as defined by claim 26.

28. The composition of matter as defined by claim 1, said dimeric fatty acid containing no more than 0.1% by weight of its monobasic fatty acid precursor.

29. The composition of matter as defined by claim 1, said dimeric fatty acid having an iodine number of about 10, and not more than 3% by weight of acid having a basicity of greater than 2.

30. The composition of matter as defined by claim 1, said dimeric fatty acid having a molecular weight between 370 and 800.

31. The composition of matter as defined by claim 1, said dimeric fatty acid having a mean molecular weight of about 565.

32. A process for the preparation of an essentially linear, flexible copolyamide having a tensile strength in excess of 5 DaN/mm$^2$, comprising homogenizing and then polycondensing the composition of matter as defined by any of claims 1, 2, 3, 4, 6, 7, 14 or 24.

* * * * *